United States Patent [19]

Mohon et al.

[11] Patent Number: 4,512,745

[45] Date of Patent: Apr. 23, 1985

[54] FLIGHT SIMULATOR WITH DUAL PROBE MULTI-SENSOR SIMULATION

[75] Inventors: Windell N. Mohon, Athens, Ala.; William T. Harris, Winter Park, Fla.

[73] Assignee: The United States of America as represented by the Secretary of the Navy, Washington, D.C.

[21] Appl. No.: 495,188

[22] Filed: May 16, 1983

[51] Int. Cl.³ .............................................. G09B 9/00
[52] U.S. Cl. ...................................... 434/43; 434/55; 434/44; 340/723
[58] Field of Search .................. 434/32, 35, 36, 38, 434/41, 43, 44, 45, 47, 49, 307, 310, 314, 20; 273/DIG. 28, 310, 348.1; 250/330, 334; 340/705, 720, 723; 358/104

[56] References Cited

U.S. PATENT DOCUMENTS

| | | | |
|---|---|---|---|
| 2,883,763 | 4/1959 | Schaper | 358/104 |
| 3,274,545 | 9/1966 | Bowles et al. | 340/705 |
| 3,508,751 | 4/1970 | Meyer et al. | 273/310 |
| 4,107,854 | 8/1978 | Bougon | 434/20 |
| 4,240,212 | 12/1980 | Marshall et al. | 273/348.1 |
| 4,328,516 | 5/1982 | Colpack et al. | 250/330 |

Primary Examiner—Richard C. Pinkham
Assistant Examiner—Vincent A. Mosconi
Attorney, Agent, or Firm—Robert F. Beers; Robert W. Adams

[57] ABSTRACT

A flight simulator utilizes dual visual probes to simulate multisensor imagery from a modelboard data base. The probes are mounted on a common gantry at a fixed relation to one another corresponding to their aircraft relation. One probe provides a wide angle visual presentation to the simulator cockpit, while the other provides a narrow field of view presentation modified and presented on a small screen CRT as a Forward Looking Infrared or other type display.

11 Claims, 2 Drawing Figures and in particular to simulated vehicles wherein multi-sensor imagery is presented. More particularly, this invention relates to the simulation of imagery for use in such simulators, and even more particularly it relates to the generation of multisensor images from modelboards.

FLIGHT SIMULATOR WITH DUAL PROBE MULTI-SENSOR SIMULATION

FIELD OF THE INVENTION

This invention relates to simulator training devices and in particular to simulated vehicles wherein multi-sensor imagery is presented. More particularly, this invention relates to the simulation of imagery for use in such simulators, and even more particularly it relates to the generation of multisensor images from modelboards.

BACKGROUND OF THE INVENTION

Heretofore, numerous video systems have been employed to probe images or scenes at one place and display them at another. It goes without saying that most of these constitute prior art which is well known to the artisan and which requires no further discussion.

Of course, there are several prior art devices which are ostensibly of some significance, inasmuch as they in some manner concern subject matter that is pertinent to the instant invention.

For example, U.S. Pat. No. 3,949,490 to Derderian et al discloses a multisensor simulator utilizing a plurality of transparencies as a data base.

U.S. Pat. No. 3,052,753 to Schwartz et al discloses the use of a television camera in conjunction with a modelboard depicting a runway, with provision for angular motion of the camera lens.

U.S. Pat. No. 3,422,207 to Flower et al is representative of a number of patents which attempt to simulate natural obscuration in the trainee's vision.

U.S. Pat. No. 4,100,571 discloses the method and apparatus of generating a 360° visual scene.

From inspection of the aforementioned and other similar patents, it may readily be inferred that many attempts have been made to simulate vehicular motion scenes by mechanical, electrical, and optical means; however, insofar as is known, none thereof have incorporated the improvements of the instant invention which allow the simulation of visual and forward looking infrared imagery from the same scene.

The use of forward looking infrared reconnaissance (FLIR) in the military is only a few years old; therefore, its use and characteristics are relatively unkown among the servicemen who will be called on to use it.

SUMMARY OF THE INVENTION

From the foregoing, it may readily be seen that there is a need for means to simulate nonvisual displays such as FLIR in flight and vehicle simulators. The instant dual purpose vehicle simulator to some extent fills that need.

In particular, the instant dual probe vehicle simulator may be used to an advantage as part of a flight simulator, although it may be of equal advantage in other type vehicles such as ship or tank simulators. In the preferred embodiment to be described hereinafter, a modelboard depicting a segment of the earth's terrain and the features thereof is the data base for two optical probes. The probes are mounted on a movable gantry which positions the probes in accordance with the simulated flight path of a simulated aircraft, wherein a trainee inputs flight controls. The first optical probe provides a full color wide angle field of view which is projected about the vehicle to present outside-the-cockpit visual cues. The second optical probe has a narrow field of view and provides video signals which are electronically processed to present a monochromatic image within the cockpit to simulate a variant of a multisensor display.

It is an object of this invention to provide a simulated multisensor display for a vehicle simulator.

Another object of the invention is to provide a multi-sensor display responsive to control inputs to the simulated vehicle.

Yet another object of the present invention is to provide a simulator for training in vehicle and weapons operations having a simulated multisensor display subtending a portion of the visual display presented.

Other objects and many of the attendant advantages of this invention will be readily appreciated as the same becomes better understood by reference to the following detailed description when considered in connection with the accompanying drawings.

DESCRIPTION OF A PREFERRED EMBODIMENT

Figure 1:
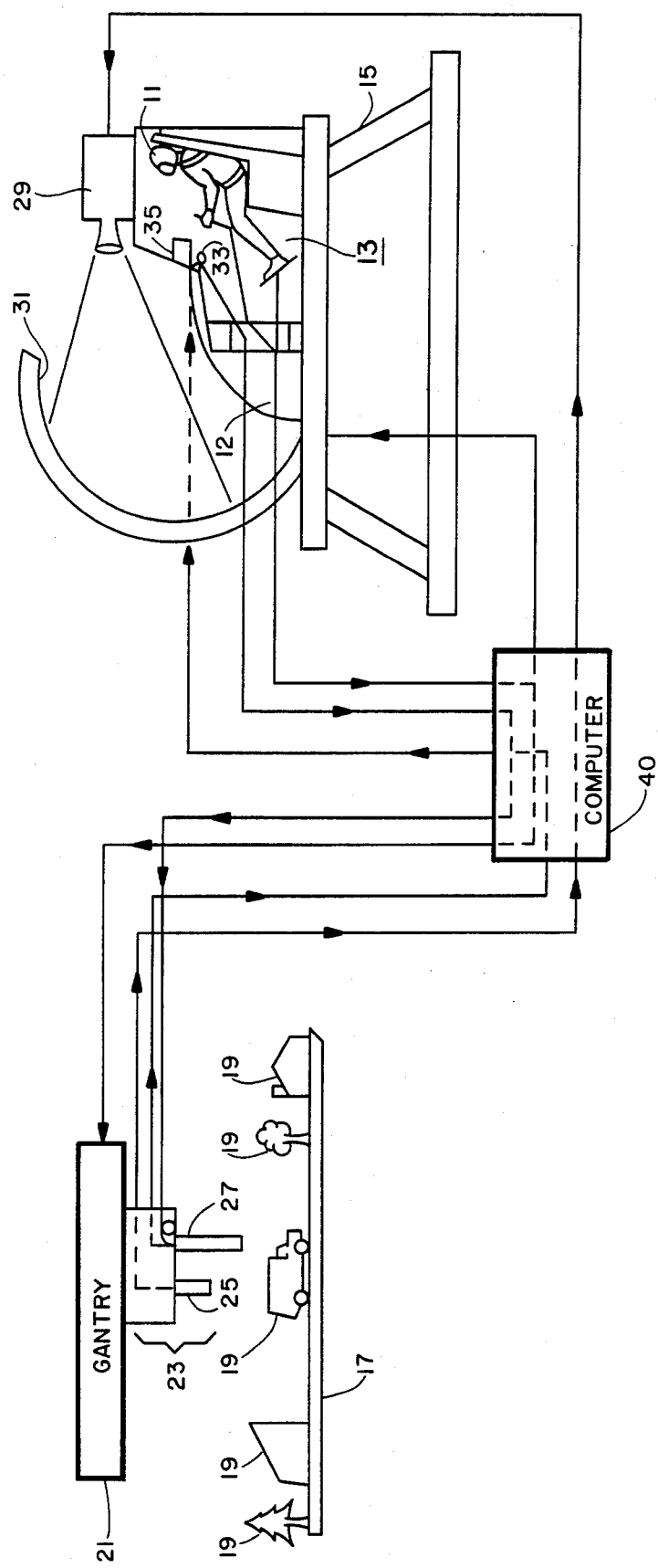
FIG. 1 is a block diagram of a simulator employing the subject invention.

Referring to FIG. 1, a trainee 11 sits within a simulated vehicle 12 or cockpit 13 which provides the desired level of realism insofar as the equipment to be trained on goes. Cockpit 13 is supported by a motion platform 15 of any conventional design, inasmuch as the platform 15 and cockpit 13 are merely choices for use in conjunction with the invention, providing physical response to the trainee simulating the flight characteristics of an aircraft. A modelboard 17 provides the basic terrain features desired for the training mission and provides a base for assorted environmental and cultural features 19, which may include vegetation, houses, vehicles, factories, and the like. As will be described hereinafter, the construction and coloration of modelboard 17 can play a key role in the utility of the invention in its alternative embodiments. Proximal to modelboard 17 and movable in relation thereto, is a gantry 21. Gantry 21 is designed to move sensor unit 23 about modelboard 17 in a manner that corresponds to the simulated flight of vehicle 12 enclosing cockpit 13. Such modelboard/gantry combinations are well known in the art, therefore further elaboration on the construction and use thereof is herein omitted.

Figure 2:
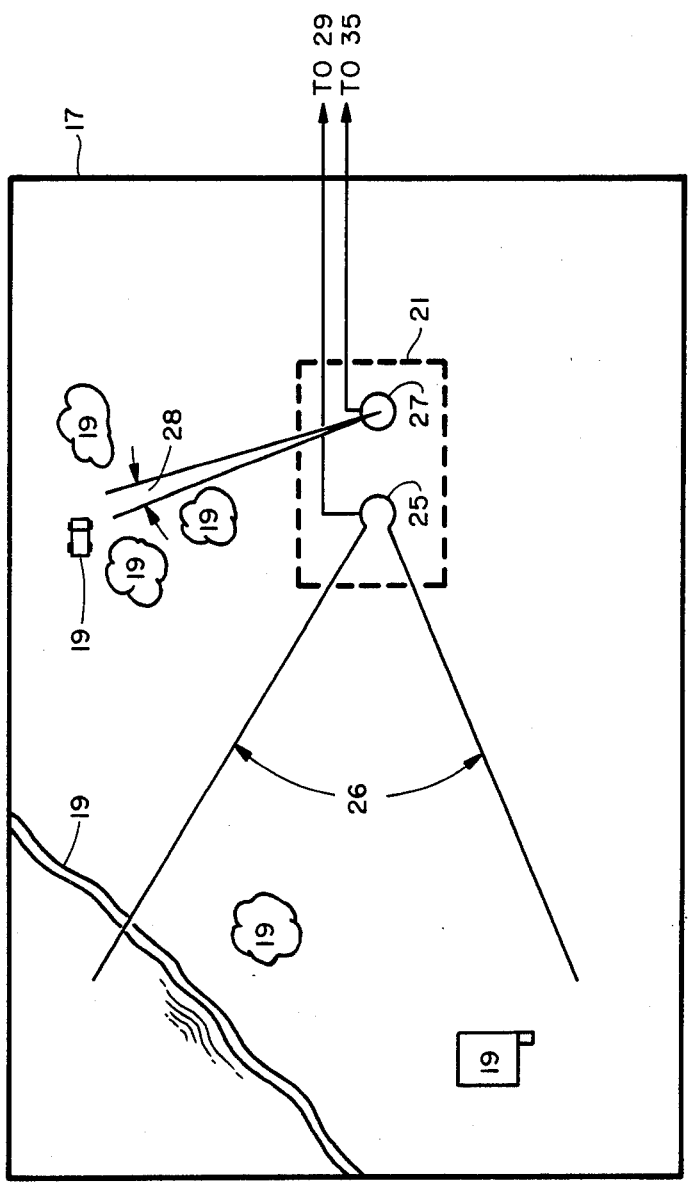
FIG. 2 illustrates the field of view comparison of the dual probes.

Referring to FIG. 2, sensor unit 23 is a multiprobe apparatus, which shall be described herein as two probe units designated as a visual probe 25 and a FLIR probe 27. Visual probe 25 has a wide angle field of view 26, preferentially about 40°×50°, and is capable of transmitting a full color picture of the section modelboard 17 within this field of view. The visual data within field of view 26 is converted into a first video signal and transmitted to a projector 29, as per FIG. 1, such as a light valve projector, which images the scene on a screen 31 in front of trainee 11. This, of course, provides trainee 11 with his visual sensory perception.

FLIR probe 27 is mounted on gantry 21 such that it can move independently of visual probe 25 in three angular degrees of freedom; however, probe 27 is constrained in its X, Y and Z location, inasmuch as both probes maintain a fixed location relative to the simulated vehicle. The direction of probe 27 is controlled by trainee 11 via control knobs 33 on a simulated thermal image display 35 in cockpit 13. FLIR probe 27 has a field of view 28 which can be varied by a zoom lens apparatus from 1°×1° to 8°×8°. FLIR probe 27 converts the visual data within field of view 28 into a second video signal; however, this video signal must be modified before being displayed on thermal image display 35. The presentation on an operational thermal display is normally a monochromatic CRT having a particular color phosphorescence, typically green, yellow or red. Therefore, the simulation of the thermal imagery can be accomplished by reversing the image resulting in a "negative" image. Bloom and wash can be inserted or deleted as need be by control of the gain. It is, of course, to be understood that simulation in this manner does not provide exact and correct thermal gradients (or signatures) but it is sufficient simulation to provide some exposure to the appearance of a thermal image display on screen 35 and its correlation with the visual display presented on screen 31.

The training capabilities of the invention may be enhanced by the next described modification, wherein modelboard 17 is fabricated such that heat may be supplied to certain of features 19. Thermal probe 27 is, in this instance, an actual thermal probe utilizing infrared transmitting and focusing optics and detectors which are sensitive in the 8-12 micron wavelength range. Obviously display 35 would, in this embodiment, be an actual thermal display and trainee 11 would be able to distinguish thermal gradients derived from modelboard 17 and features 19.

Another alternative for providing enhanced training capabilities is to provide a second modelboard 17' which is identical in terrain and features to modelboard 17, except that those features 19' which are desired to be utilized as thermal emitters are painted with selected pigments such that varying hues of illumination provide for varying degrees of reflectivity. In accordance with copending U.S. patent application Ser. No. 493,860 by Windell N. Mohon and Jimmy H. Burns, entitled Diurnal Effects Simulator, FLIR probe 27 would be a monochromatic video probe and display 35 would be a monochromatic CRT having the appropriate phosphor. In this embodiment, a second gantry 21' positions FLIR probe 27 to the equivalent relative position over modelboard 17' as gantry 21 positions visual probe 25.

It may be noteworthy to mention that in all of the above described embodiments, a computer 40 is used to interface simulated vehicle 12 to gantry 21 in a manner well known in the art, the function of computer 40 being to incorporate control inputs by trainee 11 into the necessary aerodynamic equations to determine the position of vehicle 12 relative to modelboard 17. Computer 40 is also preferentially employed to interface between the control knobs 33 and FLIR probe 27 to provide the proper angular displacement of said probe 27.

The foregoing illustrations relate only to typical examples of the capabilities of the invention. It will be readily obvious to one skilled in the art that minor variations may be made without departing from the spirit of the invention, and it is therefore intended that the invention not be limited to the specifics of the preceding description of preferred embodiments, but rather to embrace the full scope of the following claims.

What is claimed is:

1. An apparatus for simulating multisensor imagery for use with a simulated vehicle, comprising, in combination:
   means for providing simulated terrain;
   means for generating a first video signal representative of said simulated terrain;
   means for generating a second video signal representative of said simulated terrain, said means having a fixed spatial relation to said means for generating a first video signal, and an angular relation thereto variable therefrom in response to control signals input to said vehicle;
   means for positioning said first video signal generating means and said second video signal generating means in relation to said simulated terrain in accordance with control signals input to said simulated vehicle;
   means for correlating control signals input to said vehicle with said positioning means operable connected therebetween;
   means for converting said first video signal means into an image displayed as an optical image of said terrain in relation to said vehicle, operably connected to receive input from said first video signal generating means;
   means for converting said second video signal into a negative image separately displayed within said simulated vehicle as a simulated forward-looking infrared sensor display, operably connected to receive inputs from said second video signal generating means.

2. The apparatus of claim 1, wherein said first video signal generating means comprises a television camera having a wide angle field of view.

3. The apparatus of claim 1, wherein said second video signal generating means comprises a monochromatic television camera having a narrow field of view variable from 1°×1° to 8°×8°.

4. The apparatus of claim 3, wherein said means for converting said second signal comprises:
   a cathode ray tube mounted within said vehicle for displaying images from said second video signal;
   means for reversing the polarity of the image displayed on said CRT, operably connected thereto;
   means for controlling the gain on said CRT; and
   control devices mounted in association with said CRT for selecting the directional orientation of said second video signal generating means.

5. The apparatus of claim 4, wherein said means for providing simulated terrain comprises:
   a first modelboard having disposed thereon a plurality of models representing a variety of cultural and environmental features, said modelboard and said features being painted to resemble their real world counterparts, said first modelboard disposed in cooperative relation to said first video signal generating means; and
   a second modelboard of identical size and shape as said first modelboard having disposed thereon in corresponding location, the same quantity and type of cultural and environmental features, said second modelboard differing from said first modelboard only in that said second modelboard and selected features thereon are painted with specially selected paints to vary in reflectivity during varied hues of illumination, said second modelboard disposed in cooperative relation to said second signal generating means; and means for providing varied hues of illumination to said second modelboard.

6. The apparatus of claim 5, wherein said positioning means comprises two identical gantries, each supporting one of said video signal generating means and each moving synchronously to position said video signal generating means.

7. The apparatus of claim 4, wherein said means for providing a simulated terrain comprises a modelboard and a plurality of cultural and environmental features disposed about said modelboard.

8. The apparatus of claim 7, wherein said positioning means comprises a gantry operably configured to support said first and second video generating means in fixed relation to said modelboard.

9. The apparatus of claim 1, wherein said means for providing a simulated terrain comprises:
   a modelboard;
   a plurality of environmental and cultural features represented in scale models, disposed about said terrain board; and
   means for heating selected ones of said plurality of features to simulate infrared radiation therefrom.

10. The apparatus of claim 1, wherein said correlating means comprises a computer having a memory with a data base containing equations of motion for said vehicle, proportional equations for correlating inputs into said vehicle controls with said positioning means, programmed to solve said equations and control said positioning means and said vehicle in accordance therewith, having inputs from said vehicle and outputs to said vehicle and said positioning means.

11. In a simulator of an operator-controlled vehicle in which the simulator includes first display means providing a first video signal and presenting images responsive thereto for observation by said trainee of a modelboard having terrain that depicts surface features observable in the operational environment of said vehicle, wherein said vehicle includes forward looking infrared apparatus that displays sensory information to said operator about said surface features, and said simulator includes a gantry responsive to control commands from the simulated vehicle occupied by said trainee on which a first video means is mounted to provide said first video signal, means to simulate the forward looking infrared system of said vehicle for said trainee, comprising:
   display apparatus attached to said simulated vehicle and positioned within the field of view of said trainee to simulate the forward looking infrared display apparatus observable by said operator;
   monochromatic video means mounted on said gantry and responsive to independent directional commands from said simulated vehicle for providing a second video signal of said terrain; and
   processing means coupled to said monochromatic video means and to said display apparatus, for adapting said second video signal to generate a negative image on said display apparatus;
   such that the view of said terrain that is presented to said trainee by said first display means is supplemented on a separate display by a view that simulates said sensory information about the surface features depicted by said terrain.

* * * * *